United States Patent
Shtrom et al.

(10) Patent No.: US 10,045,364 B2
(45) Date of Patent: Aug. 7, 2018

(54) SCHEDULE AGGREGATION AND ANTENNA-RADIATION-PATTERN OPTIMIZATION

(71) Applicant: Ruckus Wireless, Inc., Sunnyvale, CA (US)

(72) Inventors: Victor Shtrom, Los Altos, CA (US); Sandip C Patel, San Jose, CA (US); Steve A Martin, San Jose, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 23 days.

(21) Appl. No.: 15/405,269

(22) PCT Filed: Jul. 15, 2015

(86) PCT No.: PCT/US2015/040648
§ 371 (c)(1),
(2) Date: Jan. 12, 2017

(87) PCT Pub. No.: WO2016/011200
PCT Pub. Date: Jan. 21, 2016

(65) Prior Publication Data
US 2017/0188379 A1    Jun. 29, 2017

Related U.S. Application Data

(60) Provisional application No. 62/024,976, filed on Jul. 15, 2014.

(51) Int. Cl.
*H04W 72/12* (2009.01)
*H04L 5/00* (2006.01)
*H04B 7/04* (2017.01)

(52) U.S. Cl.
CPC .............. *H04W 72/12* (2013.01); *H04B 7/04* (2013.01); *H04L 5/001* (2013.01)

(58) Field of Classification Search
CPC ........... H04W 72/12; H04L 5/001; H04B 7/04
See application file for complete search history.

(56) References Cited

U.S. PATENT DOCUMENTS

| | | | | |
|---|---|---|---|---|
| 2009/0296663 A1* | 12/2009 | Wild | ...................... | H01Q 1/246 370/335 |
| 2010/0054196 A1* | 3/2010 | Hui | ...................... | H04W 16/00 370/329 |

(Continued)

FOREIGN PATENT DOCUMENTS

WO    WO 2008/006931    1/2008

OTHER PUBLICATIONS

International Search Report and Written Opinion for PCT/US2014/040648, dated Oct. 28, 2015.

(Continued)

*Primary Examiner* — Jianye Wu
(74) *Attorney, Agent, or Firm* — Stewart M. Wiener; Steven E. Stupp

(57) ABSTRACT

An electronic device modifies a schedule of communication frequencies (such as an orthogonal frequency division multiplexing access schedule) by changing the times when subcarriers are used for communication with a set of electronic devices in order to cluster subsets of the set of electronic devices. This clustering may leave the throughput associated with the communication at least approximately unchanged. Then, the electronic device selects, for the subsets, transmit antenna radiation patterns and receive antenna radiation patterns in order to increase the throughputs during transmission and/or receiving.

22 Claims, 9 Drawing Sheets

(56) References Cited

U.S. PATENT DOCUMENTS

| | | | | |
|---|---|---|---|---|
| 2010/0130223 A1* | 5/2010 | Liao | ............... | H04B 7/0617 |
| | | | | 455/453 |
| 2010/0177717 A1 | 7/2010 | Sung et al. | ............... | 370/329 |
| 2011/0009105 A1* | 1/2011 | Lee | ............... | H01Q 9/0407 |
| | | | | 455/418 |
| 2013/0336270 A1* | 12/2013 | Nagata | ............... | H04W 16/28 |
| | | | | 370/329 |
| 2014/0004845 A1* | 1/2014 | Marque-Pucheu | . | H04W 52/244 |
| | | | | 455/422.1 |

OTHER PUBLICATIONS

International Search Report and Written Opinion for PCT/US2015/040648, dated Oct. 28, 2015.

C. Papathanasiou et al., "Downlink Transmission Optimization and Statistical Feedback Strategies in a Multi-User IEEE 802.16m System," Global Telecommunications Conference 2009, Globecom 2009, Piscataway, NJ, USA, Nov. 30, 2009, pp. 1-7.

Extended European Search Report for European Patent Application No. 15822771.0, dated Jun. 26, 2017.

* cited by examiner

SCHEDULE AGGREGATION AND ANTENNA-RADIATION-PATTERN OPTIMIZATION

CROSS REFERENCE TO RELATED APPLICATIONS

This application claims priority under 35 U.S.C. 371 to International Application No. PCT/US2015/040648, "Schedule Aggregation and Antenna-Radiation-Pattern Optimization," by Victor Shtrom, et al., filed on Jul. 15, 2015, which claims priority to U.S. Provisional Patent Application Ser. No. 62/024,976, "Small Cell Coverage Shaping, by Victor Shtrom, et al., filed on Jul. 15, 2014, the contents of both of which are herein incorporated by reference.

BACKGROUND

Field

The described embodiments relate to techniques for communicating information among electronic devices. In particular, the described embodiments relate to techniques for changing the coverage area during wireless communication in a cellular-telephone network by adapting transmit and/or receive antenna radiation patterns for the electronic devices.

Related Art

Many electronic devices are capable of wirelessly communicating with other electronic devices. For example, electronic devices often include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

In order to improve performance during wireless communication among electronic devices, many electronic devices include multiple antennas that can use beamforming techniques to produce antenna radiation patterns or beam patterns that include beams and nodes or notches. When configured properly, these antenna radiation patterns can address the performance challenges in an environment with a multi-path communication channel.

However, it can be difficult to determine the optimal antenna radiation patterns (and, thus, the antenna-radiation-pattern settings) for the multiple antennas in transmitting devices and/or receiving devices. In particular, determining the optimal antenna radiation patterns may involve coordination among the transmitting devices and the receiving devices, which may not be supported by existing communication protocols and/or by the associated networking subsystems in the transmitting devices and the receiving devices.

SUMMARY

One group of described embodiments includes an electronic device that selects a transmit antenna radiation pattern and a receive antenna radiation pattern. This electronic device includes: an antenna with multiple antenna elements; control logic coupled to the antenna; and an interface circuit coupled to the antenna. During operation, the control logic selectively adjusts an antenna radiation pattern associated with the antenna. Moreover, the interface circuit: transmits outgoing messages to a second electronic device using a set of transmit antenna radiation patterns having different transmit spatial orientations, where transmitting a given outgoing message involves selectively adjusting the antenna to have a given transmit antenna radiation pattern; and receives transmit feedback from the second electronic device about transmit throughputs associated with the set of transmit antenna radiation patterns. Furthermore, the interface circuit: receives incoming messages from the second electronic device using a set of receive antenna radiation patterns having different receive spatial orientations, where receiving a given incoming message involves selectively adjusting the antenna to have a given receive antenna radiation pattern; determines receive throughputs associated with the set of receive antenna radiation patterns; and provides receive feedback to the second electronic device about the receive throughputs associated with the set of receive antenna radiation patterns. Additionally, the interface circuit selects the transmit antenna radiation pattern based on the transmit throughputs associated with the set of transmit antenna radiation patterns and the receive antenna radiation pattern based on the receive throughputs associated with the set of receive antenna radiation patterns.

Note that the transmit antenna radiation pattern may maximize transmit throughput associated with the set of transmit antenna radiation patterns and the receive antenna radiation pattern may maximize receive throughput associated with the set of receive antenna radiation patterns. For example, the transmit throughputs associated with the set of transmit antenna radiation patterns may be based on a first number of blanked subcarriers in an orthogonal frequency division multiplexing (OFDM) communication technique, and the receive throughputs associated with the set of receive antenna radiation patterns may be based on a second number of blanked subcarriers in the OFDM communication technique.

Moreover, during operation the transmit antenna radiation pattern may be selected in order to restrict a transmit signal associated with the outgoing messages to a predefined region.

Furthermore, during operation the transmit antenna radiation pattern and the receive antenna radiation pattern may reduce interference between the electronic device and the second electronic device.

Additionally, during operation, the transmit antenna radiation pattern may be different from the receive antenna radiation pattern.

In some embodiments, during operation the control logic selectively adjusts the given transmit antenna radiation pattern and the given receive antenna radiation pattern associated with the antenna by selectively turning on and selectively turning off subsets of the antenna elements.

Moreover, during operation the interface circuit may: communicate with one or more portable electronic devices; and repeat transmitting the outgoing messages, receiving the transmit feedback, receiving the incoming messages, determining the receive throughputs, providing the receive feedback, and selecting the transmit antenna radiation pattern and the receive antenna radiation pattern (which may reduce interference between the electronic device and the one or more portable electronic devices).

Furthermore, the interface circuit includes: a processor; and a memory, coupled to the processor, which stores a program module. During operation, the processor may execute the program module to perform at least some of the aforementioned operations performed by the electronic device.

Another embodiment provides a computer-program product for use with the electronic device described previously.

This computer-program product includes instructions for at least some of the operations performed by the electronic device.

Another embodiment provides a method for selecting the transmit antenna radiation pattern and the receive antenna radiation pattern described previously. This method includes at least some of the operations performed by the electronic device.

Another group of described embodiments includes an electronic device that selects transmit antenna radiation patterns and receive antenna radiation patterns. This electronic device includes: an antenna with multiple antenna elements; control logic coupled to the antenna; and an interface circuit coupled to the antenna. During operation, the control logic selectively adjusts an antenna radiation pattern associated with the antenna. Moreover, the interface circuit determines a schedule with subcarriers used, at different times during a time interval, for communication with a set of electronic devices, where the communication with the set of electronic devices is characterized by associated initial throughputs. Then, the interface circuit modifies the schedule by changing the times when subcarriers are used for communication with the set of electronic devices in order to cluster subsets of the set of electronic devices, where the communication with the subsets is characterized by associated clustered throughputs. Furthermore, the interface circuit selects, for the subsets, the transmit antenna radiation patterns and the receive antenna radiation patterns based on antenna-pattern throughputs associated with the transmit antenna radiation patterns and the receive antenna radiation patterns.

Note that the clustered throughputs may approximately equal the initial throughputs. Alternatively, the antenna-pattern throughputs may be greater than the clustered throughputs.

Moreover, the subcarriers may be associated with an orthogonal frequency division multiplexing access (OFDMA) communication technique. However, another modulation technique may be used.

Furthermore, for a given subset, the transmit antenna radiation pattern may be different from the receive antenna radiation pattern.

Additionally, the transmit antenna radiation patterns may have different spatial orientations.

In some embodiments, the transmit antenna radiation patterns are selected in order to increase associated transmit powers relative to transmit powers used prior to the selecting.

Moreover, during operation the control logic may selectively set a given transmit antenna radiation pattern and a given receive antenna radiation pattern associated with the antenna by selectively turning on and selectively turning off subsets of the antenna elements.

Furthermore, the modifying and the selecting may be dynamically performed as a communication environment of the electronic device changes. Note that the modifying and the selecting may be performed: periodically, after a time interval, and/or as needed based on one or more performance metrics that characterize the communication.

In some embodiments, the interface circuit includes: a processor; and a memory, coupled to the processor, which stores a program module. During operation, the processor may execute the program module to perform at least some of the aforementioned operations performed by the electronic device.

Another embodiment provides a computer-program product for use with the electronic device described previously. This computer-program product includes instructions for at least some of the operations performed by the electronic device.

Another embodiment provides a method for selecting transmit antenna radiation patterns and receive antenna radiation patterns described previously. This method includes at least some of the operations performed by the electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
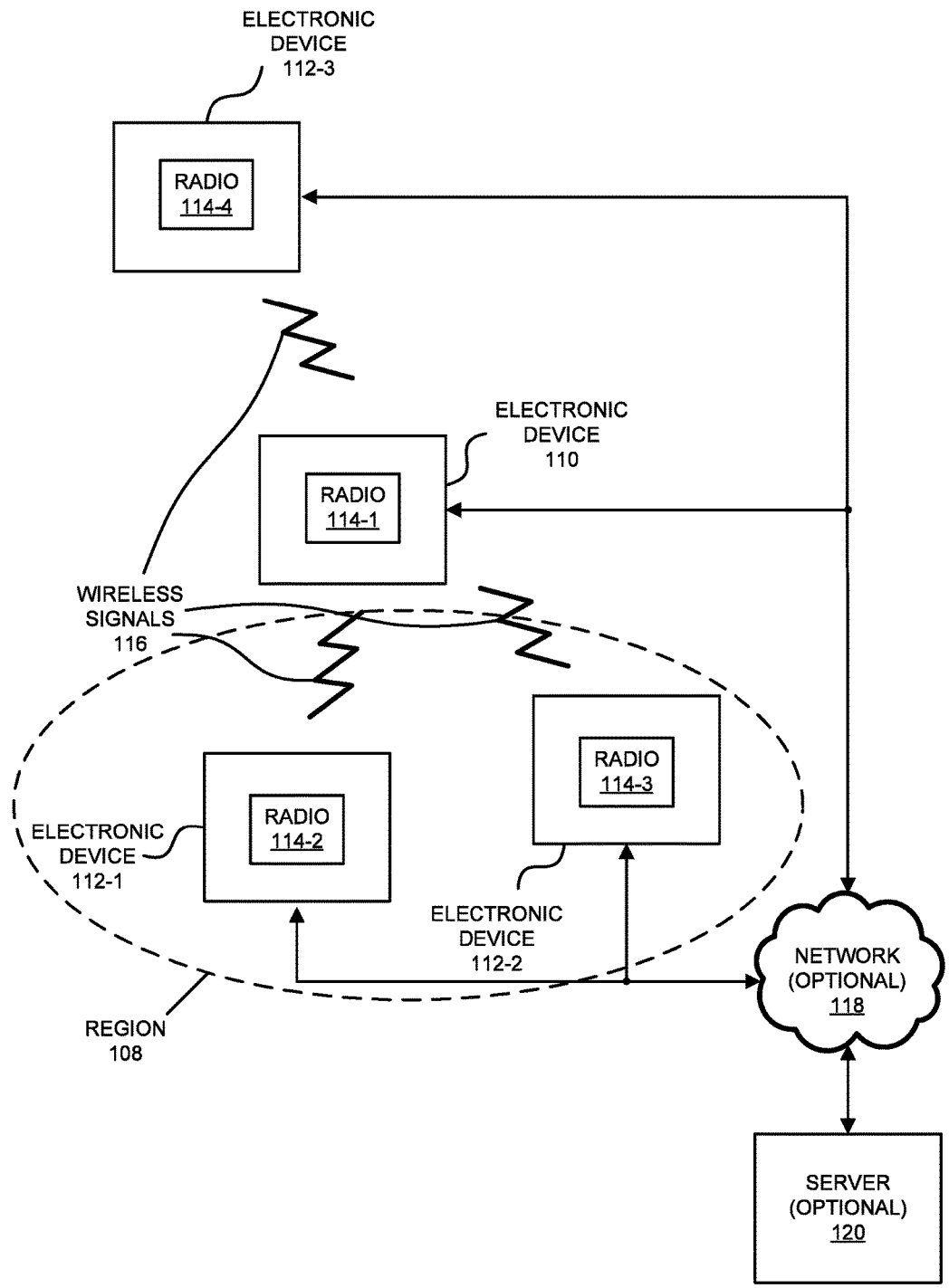
FIG. 1 is a block diagram illustrating electronic devices wirelessly communicating in accordance with embodiments of the present disclosure.

In one group of embodiments, an electronic device iteratively determines an optimal transmit antenna radiation pattern and an optimal receive antenna radiation pattern based on a feedback process with a second electronic device. First, the electronic device transmits outgoing messages to the second electronic device using a set of transmit antenna radiation patterns having different transmit spatial orientations. Based on throughput feedback from the second electronic device, the electronic device selects the optimal transmit antenna radiation pattern. Then, based on throughputs for incoming messages from the second electronic device that were received using a set of receive antenna radiation patterns having different receive spatial orientations, the electronic device selects the optimal receive antenna radiation pattern. Note that the transmit antenna radiation pattern and the receive antenna radiation pattern may reduce or eliminate interference between the electronic device and the second electronic device. Moreover, this communication technique may be performed when a network is set up and/or it may be dynamically performed while the electronic device and the second electronic device communicate with multiple instances of user equipment.

In another group of embodiments, an electronic device modifies a schedule of communication frequencies (such as an orthogonal frequency division multiplexing schedule) by changing the times when subcarriers are used for communication with a set of electronic devices in order to cluster subsets of the set of electronic devices. This clustering may leave the throughput associated with the communication at least approximately unchanged. Then, the electronic device selects, for the subsets, transmit antenna radiation patterns and receive antenna radiation patterns in order to increase the throughputs during transmission and/or receiving.

By selecting the optimal transmit antenna radiation pattern and the optimal receive antenna radiation pattern in the group of embodiments, the communication technique may maximize the transmit throughput and/or the receive throughput, which, therefore, improves the communication performance of the electronic device. Similarly, simplifying the schedule of communication frequencies and increasing the throughput during transmission and/or receiving in the other group of embodiments also improves the communication performance of the electronic device. These performance improvements may enhance the overall user experience when using the electronic device.

In the discussion that follows the electronic device includes radios that communicate packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), a cellular-telephone communication technique (such as Long-Term Evolution or LTE from the 3rd Generation Partnership Project of Sophia Antipolis Valbonne, France) and/or another type of wireless interface. In the discussion that follows, a cellular-telephone communication technique is used as an illustrative example. However, a wide variety of communication protocols may be used.

A cellular-telephone network may include base stations (and associated cell towers) that implement so-called 'macro cells.' These macro cells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macro cells. Small cells are generally radio access nodes providing lower power than macro cells and therefore providing smaller coverage areas than macro cells.

It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are more for general relative comparison purposes and should not be limiting on the scope of the embodiments of the inventions.

However, there are often gaps in the coverage offered by macro cells. Consequently, some users operate local transceivers that provide short-range communication in the cellular-telephone network. These so-called 'fempto cells' provide short-range communication (e.g., up to 10 m) for a few individuals.

In addition, larger organizations (such as those with 50-60 users) may operate local transceivers that provide communication in the cellular-telephone network over a range of 100 m. This intermediate-range coverage in the cellular-telephone network can be typically referred to as a 'small cell' as well.

Communication among electronic devices is shown in FIG. 1, which presents a block diagram illustrating electronic device 110 (such as a transceiver in a macro cell, a Fempto cell or a small cell and/or portable electronic devices, e.g., cellular telephones and, more generally, user equipment) and one or more electronic devices 112 (such as transceivers in a macro cell, a Fempto cell or a small cell and/or portable electronic devices, e.g., cellular telephones and, more generally, user equipment) wirelessly communicating. In particular, these electronic devices may wirelessly communicate while: transmitting advertising frames on wireless channels, detecting one another by scanning wireless channels, establishing connections (for example, by transmitting association requests and association responses), and/or transmitting and receiving data packets (which may include additional information as payloads). Note that the communication among electronic device 110 and the one or more electronic devices 112 may occur via a shared medium, such as a communication channel or link in a wireless network, such as a cellular-telephone network. Moreover, note that electronic device 110 and/or some of the one or more electronic devices 112 may be included in a region 108, such as one or more buildings or a portion of a building (e.g., a particular floor in a building).

As described further below with reference to FIG. 8, electronic device 110 and the one or more electronic devices 112 may include subsystems, such as a networking subsystem, a memory subsystem and a processor subsystem. In addition, electronic device 110 and the one or more electronic devices 112 may include radios 114 in the networking subsystems. More generally, electronic device 110 and the one or more electronic devices 112 can include (or can be included within) any electronic devices with the networking subsystems that enable electronic device 110 and the one or more electronic devices 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 116 (represented by jagged lines) are transmitted from a radio 114-1 in electronic device 110. These wireless signals 116 are received by radios 114 in at least one of the one or more electronic devices 112. In particular, electronic device 110 may transmit packets. In turn, these packets may be received by at least one of the one or more electronic devices 112. This may allow electronic device 110 to communicate information to electronic devices 112. While electronic devices 112 may receive information from electronic device 110, note that electronic devices 112 may also transmit information (e.g., to electronic device 110 and/or one or more of electronic devices 112).

Moreover, note that the communication between electronic device 110 and a given one of electronic devices 112 (such as electronic device 112-1) may be characterized by a variety of performance metrics, such as: a data rate, a data rate for successful communication (which is sometimes referred to as a 'throughput'), an error rate (such as a retry or resend rate, or a block error rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). More generally, the performance metric may include a value or a functional relationship indicative of how well the communication is working, which is either measured or determined based on measured information associated with the communication. In some embodiments, the communication between electronic device 110 and a given one of electronic devices 112 is characterized by an error-rate model, which compares the error rate during communication at the data rate.

Unlike the macro cells, small cells may not be carefully designed or optimized in advance. Instead, they are often randomly located with respect to each other or located by ease of placement not necessarily taking into account the total resultant radio environment. Because of the typically larger communication range associated with small cells rather than femtocells, it is more likely that small cells may result in interference in the existing cellular-telephone network (either with the macro cells and/or other small cells). Note that the femtocells, the small cells and the macro cells can be part of a common cellular-telephone network. Consequently, the transceivers in these various cells may be associated with a common provider (the provider of the cellular-telephone service). In addition, the resource blocks communicated in frames between the electronic devices in the cellular-telephone network (such as in the frames transmitted by the transceivers in the small cells) may be synchronized (i.e., the resource blocks are aligned) and may use the same range of frequencies (or frequency band). This makes it more likely that transmissions by adjacent or proximate transceivers associated with different small cells and/or macro cells in the cellular-telephone network can degrade the performance of the overall cellular-telephone network within that area of interference. For example, this interference may: reduce the throughput of the cellular-telephone network, reduce the capacity of the cellular-telephone network, increase the mean-square error, increase the block error rate, increase the retry rate, and, more generally, degrade a performance metric associated with or characterizing the communication in the cellular-telephone network.

In order to address this problem, electronic device 110 and the given one of electronic devices 112 (such as electronic device 112-1) may implement an embodiment of the communication technique. In particular, electronic device 110 (which may be associated with a given small cell) may adapt its coverage area by changing a transmit antenna radiation pattern (which is sometimes referred to as a 'transmit beam pattern') and/or a receive antenna radiation pattern (which is sometimes referred to as a 'receive beam pattern') associated with a set of antennas (or antenna elements) in electronic device 110. For example, radio 114-1 may switch to a so-called 'listening mode,' during which radio 114-1 receives or listens to communication with one or more other small cells and/or one or more macro cells (such as communication with electronic device 112-1). In particular, the communication may include control-channel information in packets associated with an LTE communication protocol that are received from the one or more other small cells and/or the one or more macro cells. Furthermore, the communication may involve time domain duplex and/or frequency domain duplex frames. More generally, the communication may include information associated with a $3^{rd}$ and/or a $4^{th}$ generation of mobile telecommunications technology, such as a communication protocol that complies with the International Mobile Telecommunications Advanced specification by the International Telecommunication Union of Geneva, Switzerland. Even more generally the concepts herein could apply to other types of wireless communication protocols and/or follow-ons to the ones mentioned above. Note that receiving the communication during the listening mode may involve scanning for neighboring transmitters, listening for the communication and/or storing a map of the wireless neighborhood of the given transceiver.

During the listening mode, radio 114-1 may change a receive antenna radiation pattern associated with a set of antennas in electronic device 110 so that the received-signal strength (e.g., a received-signal-strength indicator) associated with the communication received from the one or more other small cells and/or the one or more macro cells (such as electronic device 112-1) is reduced or minimized. Alternatively or additionally, the receive antenna radiation pattern may be changed to improve a performance metric (such as the receive throughput) and/or to reduce a performance metric (such as a received signal strength indicator) associated with the communication and/or the cellular-telephone network.

Note that the receive antenna radiation pattern (as well as the transmit antenna radiation pattern) may be adapted or changed using pattern shapers (such as reflectors) in an antenna or an antenna element in electronic device 110, which can be independently and selectively electrically coupled to ground to steer the antenna radiation pattern in different directions. Thus, if an antenna or an antenna element includes N antenna-radiation-pattern shapers, this antenna or antenna element may have $2^N$ different antenna-radiation-pattern configurations. More generally, a given antenna radiation pattern may include amplitudes and/or phases of signals that specify a direction of the main or primary lobe of a given antenna radiation pattern, as well as so-called exclusion regions (which are described further below with reference to FIG. 4).

Moreover, radio 114-1 may enter the listening mode at predefined times, such as: when radio 114-1 is set up, at a time of day (e.g., two in the morning), during a lull or low utilization, when there is a change in the cellular-telephone network and/or on demand or when an event occurs (e.g., when a user activates a user-interface icon to transition radio 114-1 into the listening mode).

This communication technique may allow radio 114-1 to select a transmit antenna radiation pattern and/or a receive antenna radiation pattern (and, more importantly, a coverage zone or area) for use in transmitting and receiving that substantially reduces or eliminates the crosstalk or interference among small cells and/or with macro cells. For example, radio 114-1 may determine the receive antenna radiation pattern (which might be the direction of the main or primary lobe of the receive antenna radiation pattern) for which the received-signal-strength indicator associated with a macro cell is the largest, and then may avoid using that receive antenna radiation pattern. (In general, the communication technique may select one particular receive antenna radiation pattern to be used by radio 114-1 at a given time.) In this way, for example, radio 114-1 may protect the macro cells from transmissions from electronic device 110. Note that the communication technique may occur after radio 114-1 has associated with the small cells, the macro cells and, more generally, with the cellular-telephone network. Consequently, the antenna-radiation-pattern modification may occur after scheduling and conflict-avoidance techniques have occurred during the association (such as techniques that select the timing of the control channels and the frequencies used by radio 114-1).

As described further below with reference to FIGS. 2-4, in some embodiments radios 114 associated with multiple small cells (such as electronic devices 110 and 112-1) communicate with each other to coordinate the optimization of their antenna radiation pattern. This approach is sometimes referred to as 'small-cell self-organized network-coverage shaping.' For example, transceivers associated with a set of two or more small cells (such as electronic devices 110 and 112-1) may collaboratively modify or optimize their antenna radiation patterns, which are associated with the sets of antennas in these transceivers. During this communication technique, radio 114-1 (which is associated with one of the small cells) may enter the listening mode at a given time, while the transceivers associated with the remaining small cells in the set (such as radio 114-2) may transmit information (such as the control channels associated with the LTE communication protocol). While electronic device 110 is in the listening mode and is optimizing its receive antenna radiation pattern, electronic device 112-1 may be in a so-called 'transmitting mode.' In the transmitting mode, electronic device 112-1 may adapt or change its transmit antenna radiation pattern.

Then, the transceivers associated with the set of small cells may exchange information about their antenna radiation patterns and/or associated performance metrics (such as channel quality indicators or CQIs, e.g., throughput). Specifically, radio 114-1 (which is associated with the small cell that is in the listening mode) may provide its receive antenna radiation pattern, and the transceivers associated with the remaining small cells (such as radio 114-2) may provide their transmit antenna radiation patterns. This process may repeat in a round-robin manner until all the transceivers associated with the set of small cells have been in the listening mode. For example, the transceivers may communicate a 'token' that allows a recipient to enter the listening mode while the transceivers associated with the remainder of the set of small cells continue normal operation. Subsequently, the token may be passed from one transceiver to another until they have all had an opportunity to enter into the listening mode. Note that the transceiver currently in the listening mode may provide receive feedback with determined transmit throughputs to the transceivers in the transmitting mode, which may be used by these transceivers to select their transmit antenna radiation patterns. Thus, when in the listening mode, radio 114-1 may provide receive feedback to radio 114-2 (which is in the transmitting mode).

Next, radios 114-1 and 114-2 in the set of small cells may select transmit antenna radiation patterns and/or receive antenna radiation patterns for the sets of antennas in electronic devices 110 and 112-1 based on the exchanged information to improve or optimize the performance metric for electronic devices 110 and 112-1 and/or the cellular-telephone network. In particular, the transmit antenna radiation patterns and/or receive antenna radiation patterns may improve or optimize the performance metric, on average, for electronic devices 110 and 112-1 associated with the set of small cells. For example, the transmit antenna radiation patterns and/or receive antenna radiation patterns may be selected so that the received-signal-strength indicators among radios 114-1 and 114-2 are reduced or minimized. Thus, the transmit antenna radiation patterns and/or receive antenna radiation patterns of the antennas in electronic devices 110 and 112-1 associated with the set of small cells may be arrayed or pointed in the same direction (e.g., they may have the same direction of sensitivity during receiving and transmitting). In this way, conflicts among the transmit antenna radiation patterns and/or receive antenna radiation patterns for the individual transceivers may be avoided. Alternatively or additionally, the transmit antenna radiation patterns and/or receive antenna radiation patterns may be selected to maximize or optimize throughputs (such as the transmit throughputs and the receive throughputs) during communication between electronic devices 110 and 112-1.

The coordination of radios 114-1 and 114-2 and the exchanged information about the transmit antenna radiation patterns and/or receive antenna radiation patterns may be communicated between electronic devices 110 and 112-1 associated with the set of small cells via wired, optical and/or Ethernet communication. For example, an X2-layer communication protocol may be used to: coordinate which radio is in the listening mode (e.g., has the token), exchange the antenna-radiation-pattern information, provide the transmit feedback, and/or communicate the selected transmit antenna radiation patterns and/or receive antenna radiation patterns. More generally, this 'back-channel' communication between radios 114-1 and 114-2 may occur via a secure channel that facilitates secure communication between electronic devices 110 and 112-1 in the small cells without using wireless communication. This back-channel communication may be compatible with a communication protocol that is compatible with a $3^{rd}$ generation partnership project, which is supported by the European Telecommunications Standards Institute of Sophia Antipolis Valbonne, France.

After the antenna radiation patterns (and, thus, the coverage) has been adapted or optimized, electronic devices 110 and 112-1 in the small cells may uplink or communicate the selected antenna radiation patterns and/or performance information as a function of time (such as hours or days) about the set of small cells to an optional server 120 (e.g., via an optional network 118, such as the Internet) and, more generally, a cloud-based computer system. This server may analyze the received information to determine if the modifications and/or optimization were successful (e.g., the average CQIs, block error rates, throughput and/or another performance metric are improved). Based on the analysis, optional server 120 may identify one or more small cells where the communication technique did not improve the performance metric. Consequently, optional server 120 may instruct electronic devices in the one or more small cells to repeat the communication technique. Alternatively, optional server 120 may instruct electronic devices in a group of small cells that surrounds (and, thus, includes) an adversely affected small cell to perform the communication technique in an attempt to improve the performance metric.

In some embodiments, a portable electronic device, such as a cellular telephone that executes a performance-improvement application, is used to facilitate the communication technique. For example, a user may activate the performance-improvement application by activating an icon in a user interface. In response, the portable electronic device may communicate (i.e., transmit and/or receive) information with electronic devices associated with proximate small cells as the portable electronic device is moved through a series of locations. The resulting map may allow the electronic devices associated with the small cell to determine the transmit antenna radiation patterns and/or the receive antenna radiation patterns that allow the electronic devices to communicate with the portable electronic device. In this way, the electronic devices may divide up a zone or region 108 (such as inside of a building) so that different small cells can help ensure coverage of the zone (e.g., each electronic device may have an associated transmit antenna radiation pattern and/or receive antenna radiation pattern that only covers a portion of the zone). Alternatively or additionally, a particular location in the zone may be given high priority to ensure that the transmit antenna radiation patterns and/or receive antenna radiation patterns are selected in such a way that there is coverage at this location. Similarly, the electronic devices may also be told or informed or another zone or region to avoid (such as an area outside of the building), and the transmit antenna radiation patterns and/or receive antenna radiation patterns may be selected to ensure an absence of coverage in the other region. While the communication with the portable electronic device may occur via wireless communication, as discussed previously the communication among the electronic devices (and with optional server 120, which may coordinate these embodiment of the communication technique) may occur via back-channel communication (such as the X2-layer communication protocol).

While the preceding discussion illustrated a quasi-static arrangement of the transmit antenna radiation patterns and/or receive antenna radiation patterns (at least until the communication technique is performed again), in some embodiments the transmit antenna radiation patterns and/or receive antenna radiation patterns may be time-specific. Thus, the transmit antenna radiation patterns and/or receive antenna radiation patterns may be changed at particular times of day to modify the coverage or the performance metric in one or more small cells, e.g., based on activity in the cellular-telephone network (such as the number of and the locations of user equipment, e.g., cellular telephones).

Moreover, the transmit antenna radiation patterns and/or receive antenna radiation patterns may be selected to reduce or eliminate the likelihood of failures, such as failures associated with handoffs. Thus, the electronic devices may divide up the zone and the transmit antenna radiation patterns and/or receive antenna radiation patterns may be selected so that handoffs are avoided (or less likely) in important areas (such as at the particular location).

In the preceding discussion, note that a given antenna radiation pattern may be associated with an antenna-radiation-pattern setting (such as a steering matrix). When transmitting or receiving data, an electronic device associated with a small cell may apply one of the antenna-radiation-pattern settings to the set of antennas in the electronic device. The resulting transmit antenna radiation pattern or receive antenna radiation pattern may have a 'notch' (which is sometimes referred to as a 'null') that includes a low-intensity region of the antenna radiation pattern (which is sometimes referred to as an 'exclusion zone' in the antenna radiation pattern). While the intensity is not zero in the exclusion zone, it may be below a threshold so that a connection is not established with the other electronic devices (such as electronic devices associated with other small cells and/or macro cells). Thus, the antenna radiation pattern may include a local minimum that reduces gain in the direction of one of the other electronic devices that is not of interest. In this way, the transmit antenna radiation pattern and/or the receive antenna radiation pattern may be selected so that communication that is undesirable (such as with one of the other electronic devices) is avoided to reduce or eliminate adverse effects on the performance metric.

Alternatively or additionally, electronic device 110 and the given one of electronic devices 112 (such as electronic device 112-1) may implement another embodiment of the communication technique, which is described further below with reference to FIGS. 5-7. In particular, electronic device 110 may determine a schedule with subcarriers used, at different times during a time interval (such as 5 min, 10 min, 30 min or 1 hour), for communication with a set of electronic devices (such as at least some of electronic devices 112). For example, the schedule may include communication frequencies or carrier frequencies associated with different subcarriers that electronic device 110 uses at different times to communicate with the set of electronic devices. In an exemplary embodiment, the subcarriers are associated with an orthogonal frequency domain multiplexing access (OFDMA) communication protocol or technique. (However, the schedule may be used with a wide variety of communication protocols or techniques.) Note that the communication with the set of electronic devices may be characterized by associated initial throughputs.

As described further below with reference to FIG. 7, in general the schedule may be determined based on availability of the subcarriers at the different times (such as subcarriers other than those that are blanked because of interference). Consequently, subcarriers used for different electronic devices in the set of electronic devices may, in principle, be distributed at arbitrary positions in the schedule. However, this schedule may not be ideal or optimal for communication because interference between the set of electronic devices may result in a large number of blanked subcarriers, which in turn may adversely affect the throughput.

In order to address this problem, electronic device 110 (and, in particular, radio 114-1) may modify the schedule by changing the times when subcarriers are used for communication with the set of electronic devices in order to cluster subcarriers used with subsets of the set of electronic devices. For example, the clustering may allow communication with a particular subset of the electronic devices to use proximate or adjacent subcarriers in the schedule at a given time. Then, as described below, the communication technique may be used to select optimal transmit antenna radiation patterns and/or optimal receive antenna radiation patterns that reduce interference among the set of electronic devices, which (as described below) may reduce the number of blanked subcarriers (i.e., may increase the number of available subcarriers) and, thus, may increase the throughput. (Thus, this embodiment of the communication technique may allow particular subcarriers to be used in conjunction with associated antenna radiation patterns so that transmission or reception from particular spatial directions is reduced or eliminated, as opposed to not using these subcarriers at all.)

Note the subset of the electronic devices may have different spatial directions or orientations from electronic device 110 in region 108, so that antenna radiation patterns that do not face each other or that may have reduced or eliminated overlap may be used (e.g., one or more of electronic devices 112 may be located at or in an exclusion zone associated with the antenna radiation patterns, which may allow electronic device 110 to communicate with user equipment while avoiding interference or crosstalk with transceivers in one or more other small cells and/or one or more macro cells).

After the modification, the communication with the subsets may be characterized by associated clustered throughputs. Note that the clustered throughputs may be approximately equal or may be greater than the initial throughputs. Thus, the clustering may be constrained so that the throughputs are at least approximately unchanged from the initial throughputs.

Next, electronic device 110 may select, for the subsets, transmit antenna radiation patterns and receive antenna radiation patterns based on antenna-pattern throughputs associated with the transmit antenna radiation patterns and the receive antenna radiation patterns. For example, electronic device 110 may perform the aforementioned operations in the communication technique, such as those in the listening mode and in the transmitting mode. By alternating the roles in the communication technique with other electronic devices in the set of electronic devices, electronic device 110 and the other electronic devices may be able to optimize their transmit antenna radiation patterns and/or their receive antenna radiation patterns in order to reduce or eliminate interference. In particular, after optimizing the antenna radiation pattern(s), the antenna-pattern throughputs may be greater than the clustered throughputs (and, thus, the initial throughputs). Thus, the additional degrees of freedom associated with the modified schedule and the selected antenna radiation patterns may allow the overall communication performance to be improved.

Note that electronic device 110 may set a given transmit antenna radiation pattern or a given receive antenna radiation pattern by selectively adjusting antenna elements in an antenna in electronic device 110. For example, control logic in electronic device 110 may selectively set the given transmit antenna radiation pattern or the given receive antenna radiation pattern by selectively turning on and/or selectively turning off subsets of the antenna elements. In general, for a given subset, the transmit antenna radiation pattern may be different from the receive antenna radiation pattern (thus, the communication channel may be asymmetric for transmitting and for receiving). Moreover, the transmit antenna radiation patterns for the different subsets may have different spatial orientations.

In some embodiments, the electronic devices in the set of electronic devices select the transmit antenna radiation patterns in order to increase associated transmit powers relative to transmit powers used prior to the selecting. Thus, by clustering the subsets, transmit antenna radiation patterns may be selected with reduced interference or improved performance, which may allow electronic device 110 to increase the transmit power.

Furthermore, electronic device 110 may dynamically perform the modifying and the selecting as a communication environment of electronic device 110 changes. In general, electronic devices 110 and electronic devices 112 in region 108 may be quasi-stationary (i.e., positions or locations of the electronic devices in the set of electronic devices may change slowly, such as at or less than the pace of a human walking). Note that the modifying and the selecting may be performed: periodically, after a time interval (such as 5 min, 10 min, 30 min or 1 hour), and/or as needed based on one or more performance metrics that characterize the communication.

In the described embodiments, processing a packet or frame in electronic device 110 and/or the one or more electronic devices 112 includes: receiving wireless signals 116 with the packet or frame; decoding/extracting the packet or frame from received wireless signals 116 to acquire the packet or frame; and processing the packet or frame to determine information contained in the packet or frame (such as feedback about the performance during the communication, etc.).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
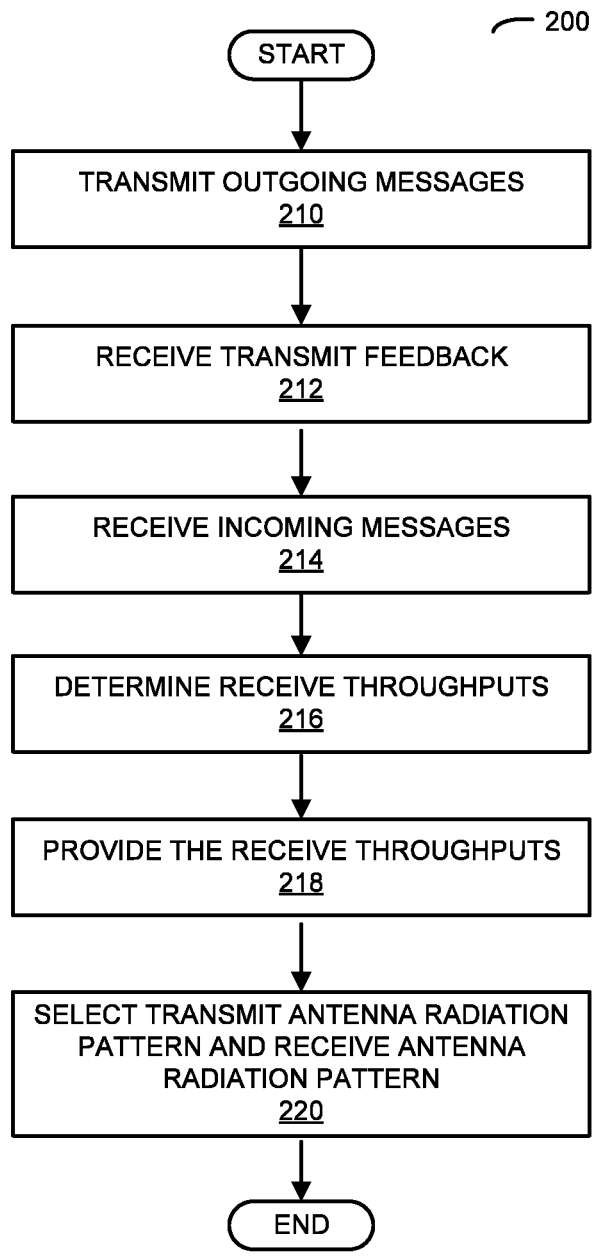
FIG. 2 is a flow diagram illustrating a method for selecting the transmit antenna radiation pattern and the receive antenna radiation pattern during communication among the electronic devices in FIG. 1 in accordance with embodiments of the present disclosure.

FIG. 2 presents a flow diagram illustrating a method 200 for selecting the transmit antenna radiation pattern and the receive antenna radiation pattern during communication among the electronic devices in FIG. 1, which may be performed by an electronic device (such as electronic device 110 in FIG. 1). During operation, the electronic device transmits outgoing messages (operation 210) to a second electronic device using a set of transmit antenna radiation patterns having different transmit spatial orientations, where transmitting a given outgoing message involves selectively adjusting an antenna in the electronic device to have a given transmit antenna radiation pattern. Then, the electronic device receives transmit feedback (operation 212) from the second electronic device about transmit throughputs associated with the set of transmit antenna radiation patterns.

Moreover, the electronic device receives incoming messages (operation 214) from the second electronic device using a set of receive antenna radiation patterns having different receive spatial orientations, where receiving a given incoming message involves selectively adjusting the antenna to have a given receive antenna radiation pattern. Next, the electronic device determines receive throughputs (operation 216) associated with the set of receive antenna radiation patterns. Furthermore, the electronic device provides receive feedback (operation 218) to the second electronic device about the receive throughputs associated with the set of receive antenna radiation patterns.

Additionally, the electronic device selects the transmit antenna radiation pattern (operation 220) based on the transmit throughputs associated with the set of transmit antenna radiation patterns and the receive antenna radiation patterns (operation 220) based on the receive throughputs associated with the set of receive antenna radiation patterns. For example, the transmit antenna radiation pattern may maximize transmit throughput associated with the set of transmit antenna radiation patterns and the receive antenna radiation pattern may maximize receive throughput associated with the set of receive antenna radiation patterns. In some embodiments, the transmit throughputs associated with the set of transmit antenna radiation patterns are based on a first number of blanked subcarriers in an OFDMA communication protocol or technique, and the receive throughputs associated with the set of receive antenna radiation patterns are based on a second number of blanked subcarriers in the OFDMA communication protocol or technique. For example, the selected transmit antenna radiation pattern may reduce the first number of blanked subcarriers and/or the selected receive antenna radiation pattern may reduce the second number of blanked subcarriers. In general, note that the transmit antenna radiation pattern may be different from the receive antenna radiation pattern.

Furthermore, the transmit antenna radiation pattern and the receive antenna radiation pattern may reduce interference between the electronic device and the second electronic device. For example, the transmit antenna radiation pattern may be selected in order to restrict a transmit signal associated with the outgoing messages to a predefined region (such as with region 108 in FIG. 1), as verified using the feedback from the second electronic device when the second electronic device is in the listening mode.

Note that in embodiments where the electronic device communicates with one or more portable electronic devices, the electronic device may repeat operations 210-220, which may reduce interference between the electronic device and the one or more portable electronic devices.

Alternatively or additionally, selection and use of the specific transmit and receive antenna patterns may be used to reduce the amount of interference created by this pair of electronic devices with respect to interfering with the operation of other systems that may be nearby. In particular, the system in question may reduce the interference that it 'hears,' and/or the system in question may reduce that interference that it 'generates,' which may affect other systems. Both scenarios are of significant technical benefit and depending on the situation one or the other may be more optimized for.

In some embodiments of method 200, there may be additional or fewer operations. For example, the operations in method 200 may be performed iteratively until a solution (such as the selected transmit antenna radiation pattern and/or the selected receive antenna radiation pattern) is determined. Additionally, the order of the operations in the communication technique may be changed, and/or two or more operations may be combined into a single operation.

Figure 3:
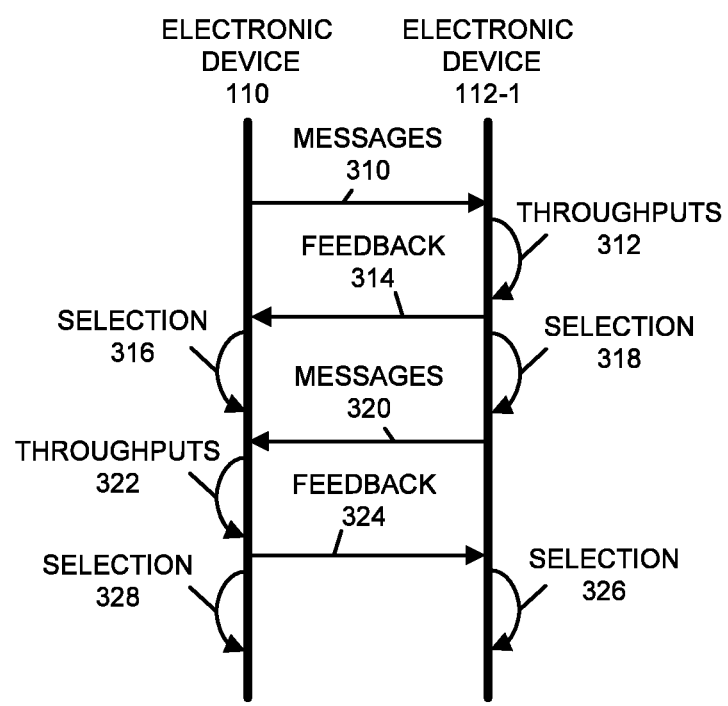
FIG. 3 is a drawing illustrating communication among the electronic devices in FIG. 1 in accordance with embodiments of the present disclosure.

FIG. 3 presents a drawing illustrating communication between electronic devices 110 and 112-1. During operation, electronic device 110 may transmit messages 310 to electronic device 112-1 using a set of transmit antenna radiation patterns having different transmit spatial orientations. Electronic device 112-1 may receive messages 310 using a set of receive antenna radiation patterns. Then, electronic device 112-1 may determine throughputs 312, which are transmitted to and received by electronic device 110 as feedback 314. Electronic device 110 may use throughputs 312 to select 316 one of set of transmit antenna radiation patterns, and electronic device 112-1 may use throughputs 312 to select 318 one of set of receive antenna radiation patterns.

Next, electronic devices 110 and 112 may reverse roles. In particular, electronic device 112-1 may transmit messages 320 to electronic device 110 using another set of transmit antenna radiation patterns. Electronic device 110 may receive messages 320 using another set of receive antenna radiation patterns having different receive spatial orientations. Moreover, electronic device 110 may determine throughputs 322 associated with the set of receive antenna radiation patterns. Based on throughputs 322, electronic device 110 may select 328 one of the other set of receive antenna radiation patterns. Furthermore, electronic device 110 may transmit feedback 324 with throughputs 322 to electronic device 112-1, and electronic device 112-1 may use feedback 324 to select 326 one of the other set of transmit antenna radiation patterns.

Figure 4:
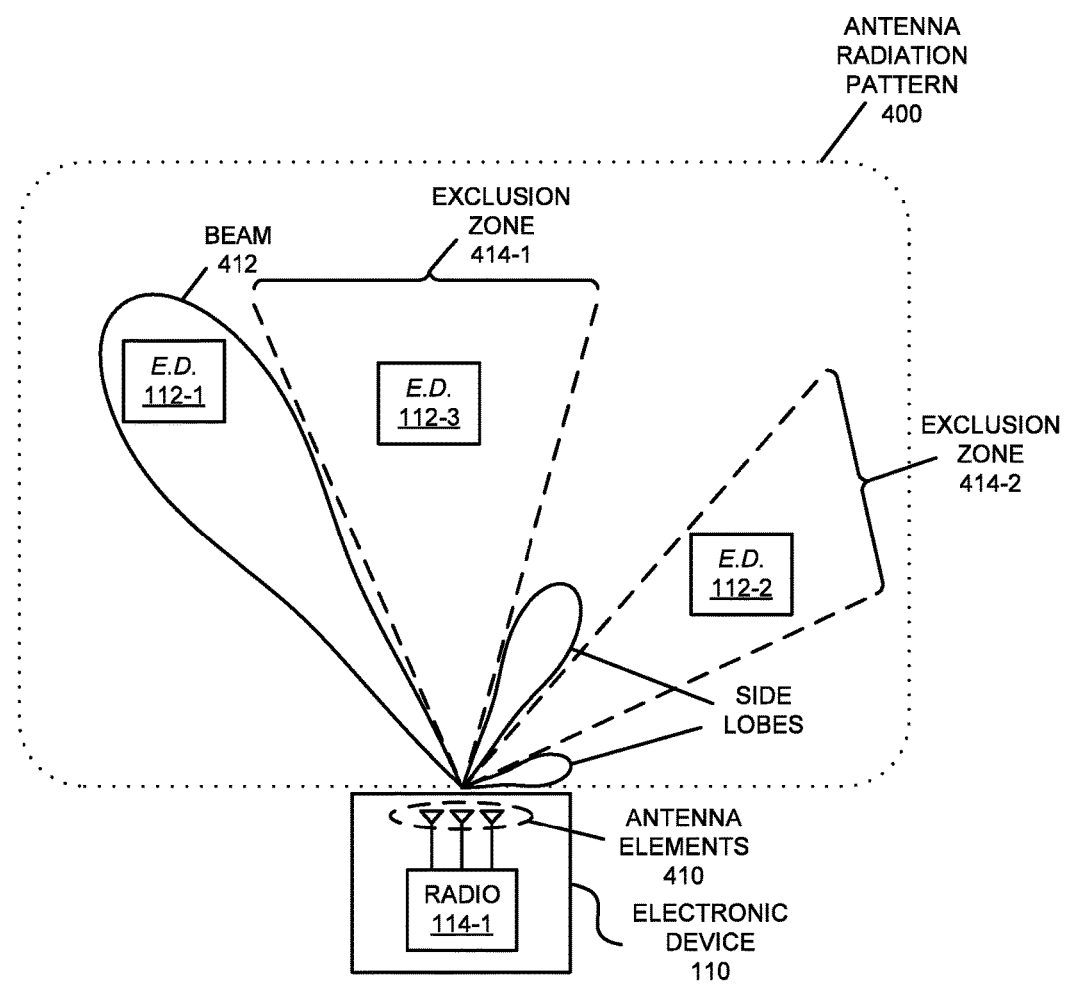
FIG. 4 is a drawing illustrating minimizing interference during communication among the electronic devices in FIG. 1 in accordance with embodiments of the present disclosure.

FIG. 4 presents a drawing illustrating minimizing interference during communication among electronic devices (E.D.) 110, 112-1, 112-2 and 112-3. In particular, electronic device 110 may select antenna radiation pattern 400 using the communication technique. Then, electronic device 110 may set antenna radiation pattern 400 by selectively turning on and selectively turning off subsets of antenna elements 410 so that a primary beam 412 in antenna radiation pattern 400 is directed at electronic device 112-1, while electronic devices 112-2 and 112-3 are located in exclusion zones 414. Note that antenna radiation pattern 400 may be predefined.

Note that antenna elements 410 (or a set of antennas) may include N antenna elements (or antennas) and there may be N−1 notches, where N is an integer. Moreover, note that an 'exclusion zone' (such as exclusion zone 414-1) of antenna radiation pattern 400 (which is sometimes referred to as a 'notch' or a 'null') includes a low-intensity region of the antenna radiation pattern 400. While the intensity is not necessarily zero in the exclusion zone, it may be below a threshold such as 3 dB or lower than the peak gain of antenna radiation pattern 400. Thus, antenna radiation pattern 400 may include a local maximum (e.g., primary beam 412) that directs gain in the direction of electronic device 112-1 that is of interest, and one or more local minima that reduce gain in the direction of electronic devices 112-2 and 112-3 that are not of interest. In this way, antenna radiation pattern 400 may be selected so that communication that is undesirable (such as with electronic devices 112-2 and 112-3) is avoided to reduce or eliminate adverse effects, such as interference or crosstalk.

In an exemplary embodiment, the transmit antenna radiation pattern and/or the receive antenna radiation pattern are selected to implement an adaptive antenna in one or more transceivers for LTE counter requirements. In particular, the communication technique may provide an adaptive-array antenna function that is generated per evolved NodeB (eNB)/cell beam to provide improved or optimal coverage and throughput in the deployed small-cell enterprise network and that works in a semi-static way using the different counters that are generated by the eNB. The communication technique may adapt the antenna radiation pattern(s) using long-term averages and trends reported by the counters of the self eNB (e.g., physical resource block or PRB usage patterns over a time duration, observed traffic load for different channel-quality-indicator classes, connected/active user load, key performance indicators or KPIs, etc.) and neighbor eNBs (e.g., observed loads and uplink or UL interferences from different neighbors during different time of day or ToD/durations, etc.).

For example, the counters generated at the eNB that may be used as an input to such a function include: a number of radio resource control (RRC) connected users; a number of active users; CQI; pre-coding matrix indicator (PMI); rank indicator (RI); PRB usage (guaranteed bit rate or GBR/non-guaranteed bit rate or nGBR and total) that may be separate for the downlink (DL) and the UL, i.e., for the self and neighbors (via the X2-layer communication protocol); cell-edge users' PRB usage in the DL and the UL (which may be irrespective of the traffic class); throughput per the CQI in the DL and the UL (based on the package data convergence protocol service data unit or PDCP SDU bit-rate); L1 reported I+N per PRB per transmission time interval or TTI, which may be averaged for durations and used; the DL and UL signal-to-interference-plus-noise ratio or SINR/CQI per UE (the CQI may be based on a cell-specific reference signal or CRS while the UL SINR may be based on a demodulation reference signal or DMRS for allocated PRBs for the physical uplink shared channel or PUSCH); additional UL SINR values for user equipment (such as a cellular telephone) over the complete bandwidth based on a sounding reference signal or SRS, if SRS is enabled); the DL and the UL block error rate or BLER (per continuous-wave or CW signal in the DL, in the UL in a single data stream); path loss and timing advance TA per user equipment; and/or the DL and UL package data convergence protocol physical data unit or PDCP PDU/packet drop rate. Furthermore, another input to the function in the communication technique may be KPI-related statistics, such as: the number of RRC connection re-establishments; the RRC connection-establishment success rate; the handover or HO success rate (inter-eNB, intra/inter-frequency); and/or the RRC connection/call drop rate (due to radio link failure or RLF or local/mobile management entity or MME generated with data activity on). Additionally, other inputs to the function in the communication technique may include: miscellaneous counters or available measurements; layer 3 (L3) measurements from the user equipment for self and neighbors (reference signal received power or RSRP and reference signal received quality or RSRQ); hardware/S1 interface transport network layer load indicators (qualitative) for self and neighbors (via the X2-layer communication protocol); and/or reserved capacity of neighbor and available capacity over a period of time (via the X2-layer communication protocol).

Note that the CQI counter may provide information on the number of times a particular CQI value has been reported (wideband and/or sub-band).

Furthermore, an effective CQI (BLER corrected CQI/SINR) and/or the PMI at sub-band level may be used for frequency-selective scheduling. Note that periodic and aperiodic CQI reports may be obtained from the user equipment. An analysis technique may be used to select edge-of-cell user equipment to probe sub-bands and histogram the CQI elements. Because the information may be available for sub-band-level CQI reports, a histogram of the same information for the cell-edge users may also be available.

Additionally, the DL and the UL BLER may be available per modulation type. This information may be used to correct the received CQI. The BLER information may be used for the wideband CQI and may (or may not) be implemented per modulation type.

These parameters may be useful for a self-organizing network (SoN). For example, the resource management or eICIC features of a SoN can be used to further optimize the antenna patterns. In particular, the resource management or eICIC features may attempt to mimimize inter-cell interference via subcarrier blanking or not scheduling subcarrier resource blocks at specific times (these resource blocks may be used by neighbouring cells). By observing the ratio of resource blocks users to the total number of available resource blocks, the the total number of available resource blocks for a given cell may be optimized. Note that layer 2, including the scheduler, may support a number of statistics that are provided per user equipment at a logical channel level (although some like PRB usage, random access procedure (RACH) attempts of different types and L3 KPIs like the RRC connection-establishment success rate, etc. may be available at the cell level and/or at the user-equipment level). Note that the statistics may be supplied to higher layers (such as L3).

Figure 5:
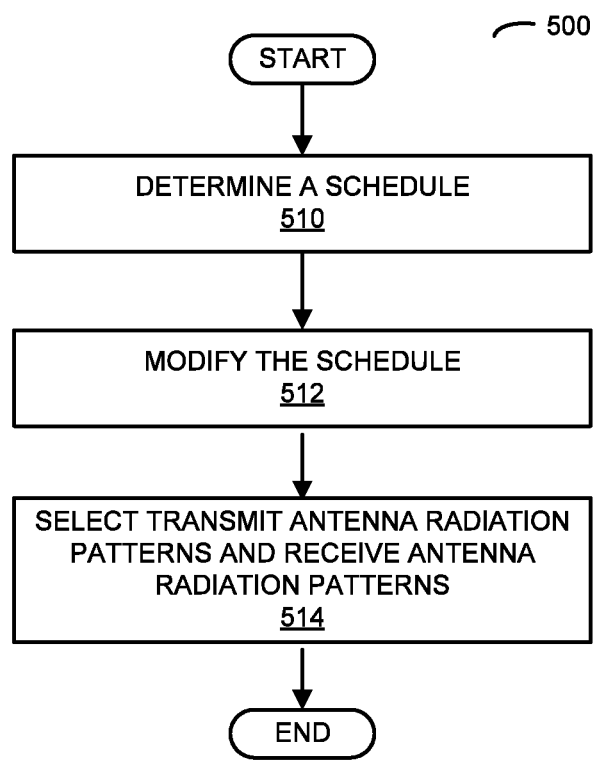
FIG. 5 is a flow diagram illustrating a method for selecting transmit antenna radiation patterns and receive antenna radiation patterns during communication among the electronic devices in FIG. 1 in accordance with embodiments of the present disclosure.

FIG. 5 presents a flow diagram illustrating a method 500 for selecting transmit antenna radiation patterns and receive antenna radiation patterns during communication among the electronic devices in FIG. 1, which may be performed by an electronic device (such as electronic device 110 in FIG. 1).

During operation, the electronic device determines a schedule (operation 510) with subcarriers (such as OFDMA subcarriers) used, at different times during a time interval, for communication with a set of electronic devices, where the communication with the set of electronic devices is characterized by associated initial throughputs. Then, the electronic device modifies the schedule (operation 512) by changing the times when subcarriers are used for communication with the set of electronic devices in order to cluster subsets of the set of electronic devices, where the communication with the subsets is characterized by associated clustered throughputs (which may approximately equal the initial throughputs, e.g., clustered throughputs may be within 10 or 25% of the initial throughputs).

Moreover, the electronic device selects, for the subsets, transmit antenna patterns and receive antenna patterns (operation 514) based on antenna-pattern throughputs associated with the transmit antenna patterns and the receive antenna patterns, where one of a given transmit antenna pattern and a given receive antenna pattern is set by selectively adjusting antenna elements in an antenna in the electronic device.

Note that the antenna-pattern throughputs may be greater than the clustered throughputs. In addition, the transmit antenna radiation patterns may have different spatial orientations and/or, for a given subset, the transmit antenna radiation pattern may be different from the receive antenna radiation pattern. In some embodiments, the transmit antenna radiation patterns are selected in order to increase associated transmit powers relative to transmit powers used prior to the selecting.

The modifying and the selecting may be dynamically performed as a communication environment of the electronic device changes, such as when: user equipment (such as cellular telephones) move, are added to a small cell, and/or leave the small cell. Note that the modifying and the selecting may be performed: periodically, after a time interval, and/or as needed based on one or more performance metrics that characterize the communication.

In some embodiments of method 500, there may be additional or fewer operations. Additionally, the order of the operations in the communication technique may be changed, and/or two or more operations may be combined into a single operation.

Figure 6:
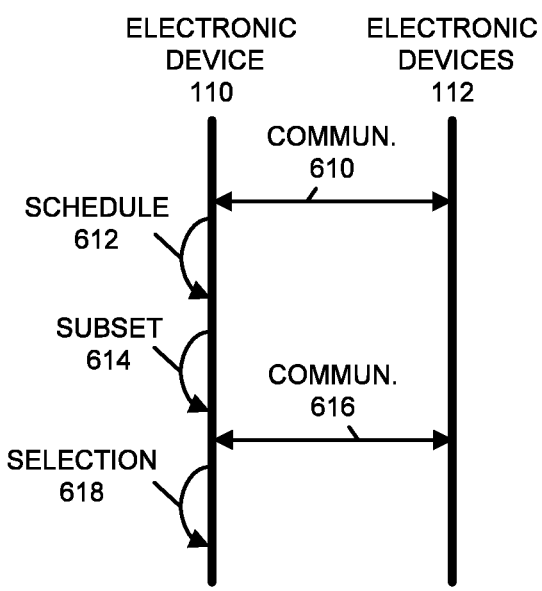
FIG. 6 is a drawing illustrating communication among the electronic devices in FIG. 1 in accordance with embodiments of the present disclosure.

FIG. 6 presents a drawing illustrating communication between electronic devices 110 and 112. In particular, electronic device 110 may determine a schedule 612 with subcarriers used, at different times during a time interval, for communication 610 with electronic devices 112. Then, electronic device 110 modifies schedule 612 by changing the times when subcarriers are used for communication with electronic devices 112 in order to cluster subsets 614 of electronic devices 112.

Moreover, electronic device 110 selects 618, for subsets 614, transmit antenna patterns and receive antenna patterns based on antenna-pattern throughputs (i.e., communication 616) associated with the transmit antenna patterns and the receive antenna patterns.

Figure 7:
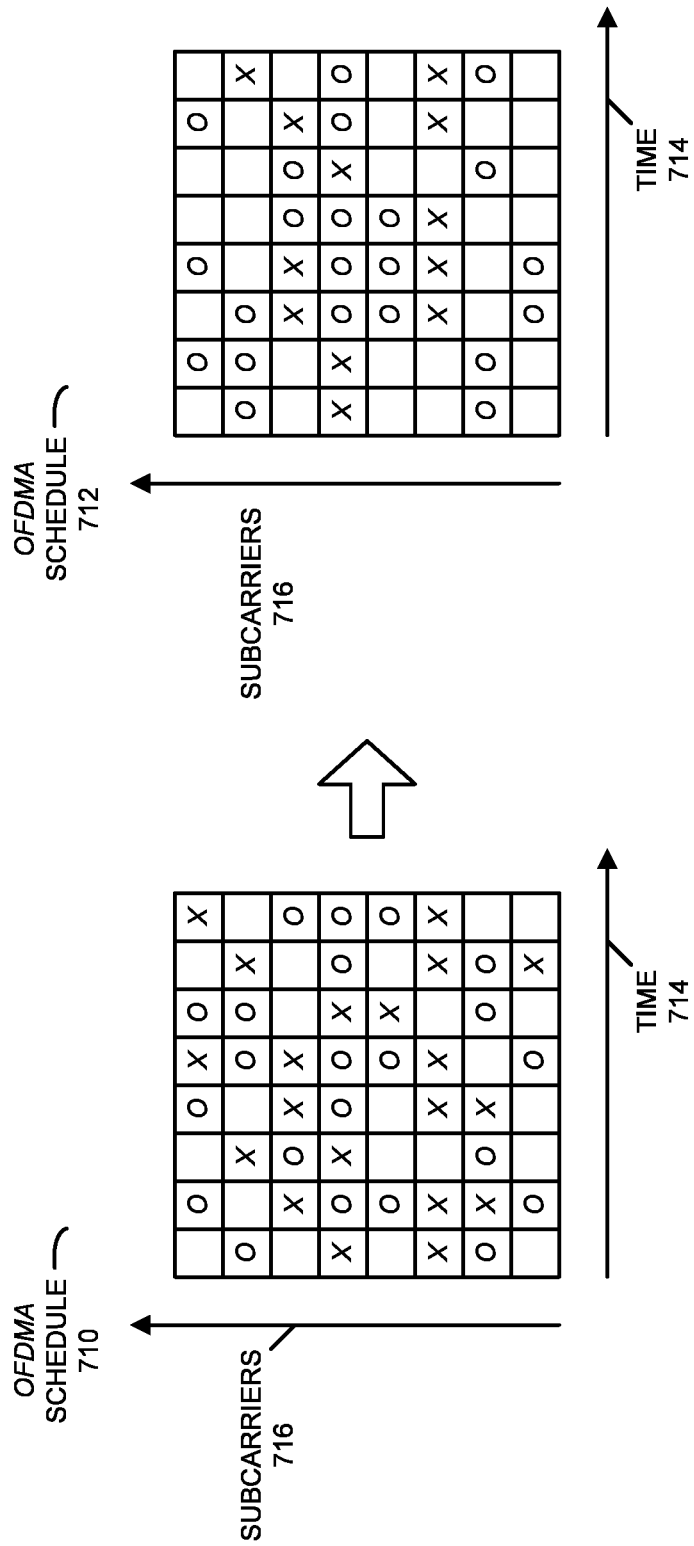
FIG. 7 is a drawing illustrating modifying an orthogonal frequency division multiplexing access (OFDMA) schedule by changing the times when subcarriers are used for communication with a set of electronic devices in FIG. 1 in order to cluster subsets of the set of electronic devices in accordance with embodiments of the present disclosure.

FIG. 7 presents a drawing illustrating modifying OFDMA schedule 710 to generated OFDMA schedule 712 by changing the times 714 when subcarriers 716 are used for communication with a set of electronic devices in order to cluster subsets of the set of electronic devices. In particular, OFDMA schedules 710 and 712 may dynamically allocate (using frequency division multiplexing and time division multiplexing) resource blocks (such as subcarriers) to the set of electronic devices (as indicated by 'Os' in FIG. 7).

Moreover, as indicated by the 'Xs' in OFDMA schedule 710, the cellular-telephone network may blank out some subcarriers based on measured interference.

By aggregating the resource blocks in OFDMA schedule 712, subsets of the set of electronic devices may be generated. This aggregation and the selected antenna radiation patterns determined using the communication technique may provide additional degrees of freedom that reduce interference and, thus, the number of blanked out subcarriers in OFDMA schedule 712, thereby increasing the throughput during communication among the set of electronic devices. Alternatively or additionally, the selected antenna radiation patterns may allow the transmit powers used by the set of electronic devices to be increased.

We now describe embodiments of an electronic device, such as a transceiver associated with a small cell. FIG. 8 presents a block diagram illustrating an electronic device 800 in accordance with some embodiments. This electronic device includes processing subsystem 810, memory subsystem 812, and networking subsystem 814. Processing subsystem 810 includes one or more devices configured to perform computational operations. For example, processing subsystem 810 can include one or more microprocessors, application-specific integrated circuits (ASICs), microcontrollers, programmable-logic devices, and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), and/or other types of memory. In some embodiments, instructions for processing subsystem 810 in memory subsystem 812 include: one or more program modules or sets of instructions (such as program module 822 or operating system 824), which may be executed by processing subsystem 810. Note that the one or more computer programs may constitute a computer-program mechanism. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Figure 8:
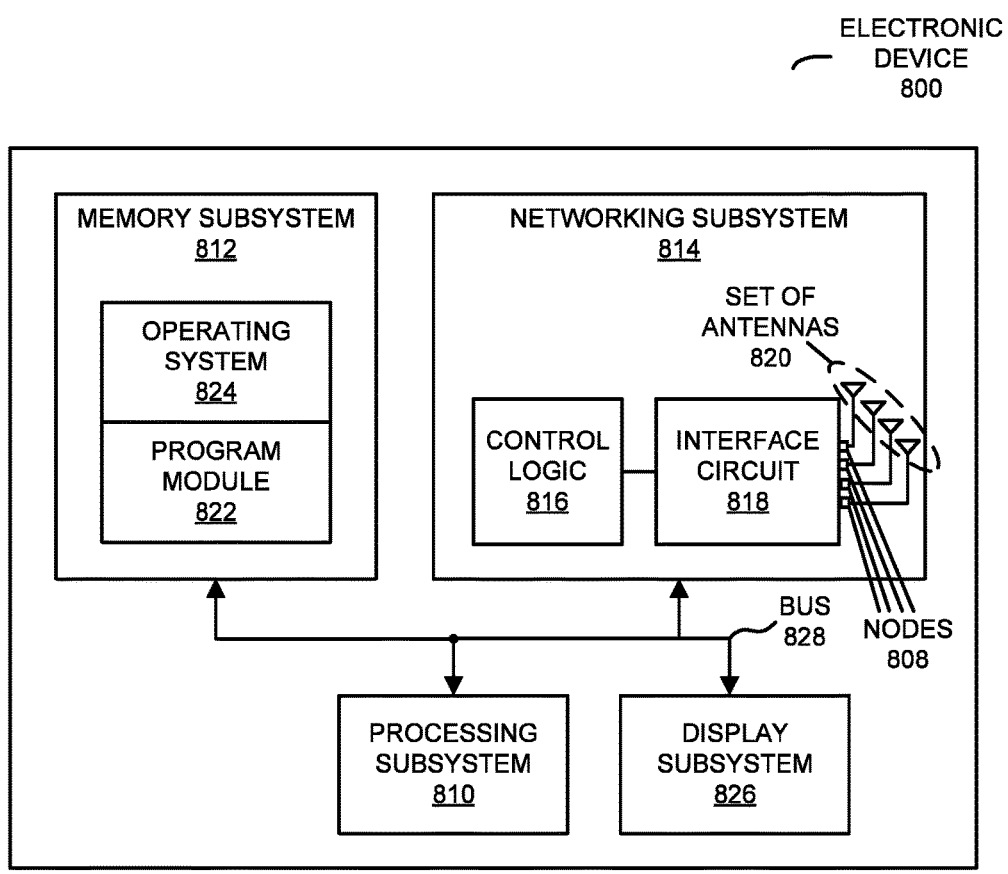
FIG. 8 is a block diagram illustrating one of the electronic devices of FIG. 1 in accordance with embodiments of the present disclosure.

Networking subsystem 814 includes one or more devices configured to couple to and communicate on a wired and/or wireless network (i.e., to perform network operations), including: control logic 816, an interface circuit 818 and a set of antennas 820 (or antenna elements) in an adaptive array that can be selectively turned on and/or off by control logic 816 to create a variety of antenna radiation patterns or 'beam patterns.' (While FIG. 8 includes set of antennas 820, in some embodiments electronic device 800 includes one or more nodes, such as nodes 808, e.g., a pad, which can be coupled to set of antennas 820. Thus, electronic device 800 may or may not include set of antennas 820.) For example, networking subsystem 814 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Moreover, networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices as described previously.

Within electronic device 800, processing subsystem 810, memory subsystem 812, and networking subsystem 814 are coupled together using bus 828. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes a display subsystem 826 for displaying information on a display, which may include a display driver and the display, such as a liquid-crystal display, a multi-touch touchscreen, etc.

Electronic device 800 can be (or can be included in) any electronic device with at least one network interface. For example, electronic device 800 can be (or can be included in): a desktop computer, a laptop computer, a subnotebook/netbook, a server, a tablet computer, a smartphone, a cellular telephone, a consumer-electronic device, a portable computing device, an access point, a transceiver, a router, a switch, communication equipment, test equipment, and/or another electronic device.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, set of antennas 820 (or antenna elements) may include a set of static sector antennas (that cover particular predefined portions of an external environment) or a phased-antenna array. Furthermore, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments program module 822 is included in operating system 824 and/or control logic 816 is included in interface circuit 818.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

Figure 9:
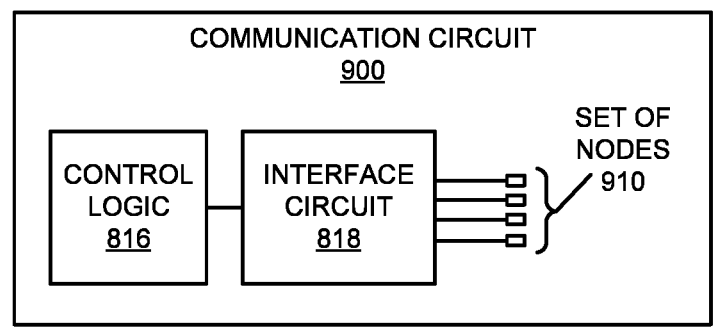
FIG. 9 is a block diagram illustrating a communication circuit for use in the one of the electronic devices in FIG. 1 in accordance with embodiments of the present disclosure.

An integrated circuit (which is sometimes referred to as a 'communication circuit') may implement some or all of the functionality of networking subsystem 814. This is illustrated in FIG. 9, which presents a block diagram of communication circuit 900 in accordance with some embodiments. In particular, communication circuit 900 may include: control logic 816, an interface circuit 818 and a set of nodes 910 (such as pads) that can couple to set of antennas 820 (FIG. 8).

Referring back to FIG. 8, the integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises a control channel, calculating an antenna radiation pattern, etc.)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an LTE communication protocol as an illustrative example, in other embodiments a wide variety of cellular-telephone communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 822, operating system 824 (such as a driver for interface circuit 818) or in firmware in interface circuit 818. Alternatively or additionally, at least some of the operations in the communication technique may be implemented in a physical layer, such as hardware in interface circuit 818.

Furthermore, while the preceding embodiments illustrated the use of the communication technique in the transceivers, in other embodiments the selection of the antenna radiation patterns is performed remotely in a system per radio, per wireless network, per client, etc. Thus, at least some of the operations in the communication technique may be performed by a remote electronic device or server. For example, the selection of the antenna radiation patterns may be performed by the server and then may be provided to the transceivers.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an antenna that includes multiple antenna elements;
control logic coupled to the antenna, wherein the control logic is configured to selectively adjusts an antenna radiation pattern associated with the antenna; and
an interface circuit, coupled to the antenna, wherein the interface circuit is configured to:
determine a schedule with subcarriers used, at different times during a time interval, for communication with a set of electronic devices, wherein the communication with the set of electronic devices is characterized by associated initial throughputs;

modify the schedule by changing the times when subcarriers are used for communication with the set of electronic devices in order to cluster subsets of the set of electronic devices, wherein the communication with the subsets is characterized by associated clustered throughputs; and select, for the subsets, transmit antenna radiation patterns and receive antenna radiation patterns based on antenna-pattern throughputs associated with the transmit antenna radiation patterns and the receive antenna radiation patterns.

2. The electronic device of claim 1, wherein the clustered throughputs approximately equal the initial throughputs.

3. The electronic device of claim 1, wherein the antenna-pattern throughputs are greater than the clustered throughputs.

4. The electronic device of claim 1, wherein the subcarriers are associated with an orthogonal frequency division multiplexing access (OFDMA) communication technique.

5. The electronic device of claim 1, wherein, for a given subset, the transmit antenna radiation pattern is different from the receive antenna radiation pattern.

6. The electronic device of claim 1, wherein the transmit antenna radiation patterns have different spatial orientations.

7. The electronic device of claim 1, wherein the transmit antenna radiation patterns are selected in order to increase associated transmit powers relative to transmit powers used prior to the selecting.

8. The electronic device of claim 1, wherein the control logic selectively sets a given transmit antenna radiation pattern and a given receive antenna radiation pattern associated with the antenna by selectively turning on and selectively turning off subsets of the antenna elements.

9. The electronic device of claim 1, wherein the modifying and the selecting are dynamically performed as a communication environment of the electronic device changes.

10. The electronic device of claim 1, wherein the modifying and the selecting are performed one of: periodically, after a time interval, and as needed based on one or more performance metrics that characterize the communication.

11. The electronic device of claim 1, wherein the interface circuit further comprises:
a processor; and
a memory, coupled to the processor, which stores a program module, wherein, when executed by the processor, the program module causes the electronic device to modify the schedule and select the transmit antenna radiation patterns and the receive antenna radiation patterns.

12. A non-transitory computer-readable storage medium for use in conjunction with an electronic device, the computer-readable storage medium storing a program module to select transmit antenna radiation patterns and receive antenna radiation patterns, wherein, when executed by the electronic device, the program module causes the electronic device to:
determine a schedule with subcarriers used, at different times during a time interval, for communication with a set of electronic devices, wherein the communication with the set of electronic devices is characterized by associated initial throughputs;
modify the schedule by changing the times when subcarriers are used for communication with the set of electronic devices in order to cluster subsets of the set of electronic devices, wherein the communication with the subsets is characterized by associated clustered throughputs; and
select, for the subsets, the transmit antenna radiation patterns and the receive antenna radiation patterns based on antenna-pattern throughputs associated with the transmit antenna radiation patterns and the receive antenna radiation patterns, wherein one of a given transmit antenna radiation pattern and a given receive antenna radiation pattern is set by selectively adjusting antenna elements in an antenna in the electronic device.

13. The computer-readable storage medium of claim 12, wherein the clustered throughputs approximately equal the initial throughputs; and
wherein the antenna-pattern throughputs are greater than the clustered throughputs.

14. The computer-readable storage medium of claim 12, wherein the subcarriers are associated with an orthogonal frequency division multiplexing access (OFDMA) communication technique.

15. The computer-readable storage medium of claim 12, wherein, for a given subset, the transmit antenna radiation pattern is different from the receive antenna radiation pattern.

16. The computer-readable storage medium of claim 12, wherein the transmit antenna radiation patterns have different spatial orientations.

17. The computer-readable storage medium of claim 12, wherein the transmit antenna radiation patterns are selected in order to increase associated transmit powers relative to transmit powers used prior to the instructions for selecting.

18. The computer-readable storage medium of claim 12, wherein, when executed by the electronic device, the program module causes the electronic device to selectively set the one of the given transmit antenna radiation pattern and the given receive antenna radiation pattern associated with the antenna by selectively turning on and selectively turning off subsets of the antenna elements.

19. The computer-readable storage medium of claim 12, wherein the modifying and the selecting are dynamically performed as a communication environment of the electronic device changes.

20. A method for selecting transmit antenna radiation patterns and receive antenna radiation patterns, wherein the method comprises:
by an electronic device:
determining a schedule with subcarriers used, at different times during a time interval, for communication with a set of electronic devices, wherein the communication with the set of electronic devices is characterized by associated initial throughputs;
modifying the schedule by changing the times when subcarriers are used for communication with the set of electronic devices in order to cluster subsets of the set of electronic devices, wherein the communication with the subsets is characterized by associated clustered throughputs; and
selecting, for the subsets, transmit antenna radiation patterns and receive antenna radiation patterns based on antenna-pattern throughputs associated with the transmit antenna radiation patterns and the receive antenna radiation patterns, wherein one of a given transmit antenna radiation pattern and a given receive antenna radiation pattern is set by selectively adjusting antenna elements in an antenna in the electronic device.

21. The method of claim 20, wherein the antenna-pattern throughputs are greater than the clustered throughputs.

22. The method of claim 20, wherein the subcarriers are associated with an orthogonal frequency division multiplexing access (OFDMA) communication technique.

\* \* \* \* \*